United States Patent
Bhanage et al.

(10) Patent No.: US 9,516,672 B2
(45) Date of Patent: Dec. 6, 2016

(54) DYNAMIC USE OF RTS AND/OR CTS FRAMES

(71) Applicant: Aruba Networks, Inc., Sunnyvale, CA (US)

(72) Inventors: Gautam Bhanage, Sunnyvale, CA (US); Manoj Gupta, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 127 days.

(21) Appl. No.: 14/528,087

(22) Filed: Oct. 30, 2014

(65) Prior Publication Data

US 2016/0127947 A1 May 5, 2016

(51) Int. Cl.
*H04W 4/00* (2009.01)
*H04W 74/00* (2009.01)
*H04L 1/00* (2006.01)

(52) U.S. Cl.
CPC .............. *H04W 74/002* (2013.01); *H04L 1/00* (2013.01)

(58) Field of Classification Search
CPC ............... H04W 72/12; H04W 72/04; H04W 72/0433; H04W 74/002; H04W 28/044; H04W 72/08; H04L 1/00
USPC ......................................................... 370/328
See application file for complete search history.

(56) References Cited

U.S. PATENT DOCUMENTS

| | | | | |
|---|---|---|---|---|
| 2013/0135988 A1* | 5/2013 | Kim | ...................... | H04L 1/1819 370/216 |
| 2013/0235773 A1* | 9/2013 | Wang | ................ | H04W 52/0206 370/311 |

* cited by examiner

*Primary Examiner* — Sai-Ming Chan
(74) *Attorney, Agent, or Firm* — Brooks, Cameron & Huebsch, PLLC

(57) ABSTRACT

A method is described for intelligently toggling request-to-send/clear-to-send (RTS/CTS) mechanisms on and off for a channel between an access point and a client device. In particular, the method may determine one or more characteristics related to the transmission of frames and toggle RTS/CTS based on these characteristics. The characteristics may describe (1) the airtime used to transmit frames, (2) the data rate used to transmit frames, (3) traffic measurements on the wireless channel between the access point and the client device, (4) overlapping basic service set traffic measurements, and (5) the number of data units included in frames to be transmitted. By toggling RTS/CTS on and off based on network/channel and frame conditions/characteristics, the method ensures that RTS/CTS is enabled when frame collisions are likely and/or channel capacity is low and disabled when frame collisions are unlikely and the overhead associated with RTS/CTS outweighs the potential benefits.

22 Claims, 5 Drawing Sheets

DYNAMIC USE OF RTS AND/OR CTS FRAMES

TECHNICAL FIELD

The present disclosure relates to intelligently toggling request-to-send/clear-to-send (RTS/CTS) mechanisms on and off for a set of wireless devices based on the conditions of the network environment in which the wireless devices are operating.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

For example, in some situations a large number of wireless devices may be operating within a network environment. In this case, data and/or control frames may collide during transmission. Although mechanisms have been presented that potentially reduce the number of collisions in a high traffic or noisy environment, these systems often create unneeded overhead during less congested situations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
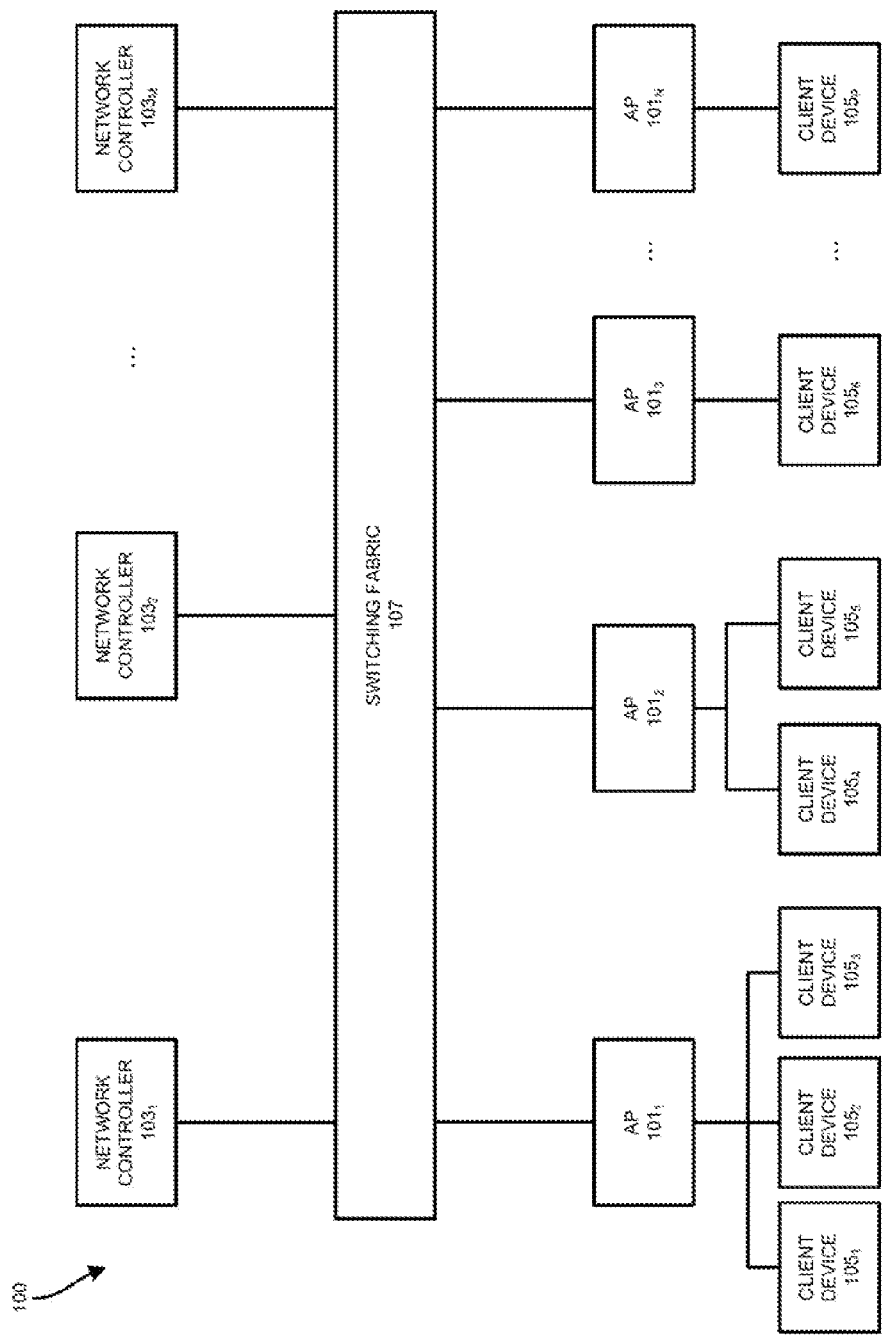
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

FIG. 1 shows a block diagram example of a network system 100 in accordance with one or more embodiments. The network system 100, as illustrated in FIG. 1, is a digital system that may include a plurality of digital devices such as one or more access points $101_1$-$101_N$, one or more network controllers $103_1$-$103_M$, and one or more client devices $105_1$-$105_P$. The access points $101_1$-$101_N$ and the network controllers $103_1$-$103_M$ may be connected through the switching fabric 107 via wired and/or wireless connections. The client devices $105_1$-$105_P$ may be connected or otherwise associated with the access points $101_1$-$101_N$ through corresponding wireless connections.

Each of the access points $101_1$-$101_N$ may be assigned wireless channels for communicating with other devices in the network system 100 (e.g., the client devices $105_1$-$105_P$). As will be described in greater detail below, the access points $101_1$-$101_N$ and the client devices $105_1$-$105_P$ may utilize request-to-send/clear-to-send (RTS/CTS) protocols to ensure that frame collisions on the same channel are reduced and/or eliminated. In some embodiments, the access points $101_1$-$101_N$ and the client devices $105_1$-$105_P$ may selectively toggle RTS/CTS protocols/mechanisms on and off based on the environment in which the access points $101_1$-$101_N$ and the client devices $105_1$-$105_P$ are operating. In this fashion, RTS/CTS may assist in reducing the number of frame collisions when the network system 100 is susceptible to collisions while not adding overhead when the network system 100 is less susceptible to collisions.

The network system 100 may be installed/distributed in any region or area. For example, the network system 100 may be installed in an office building or another similar structure. The location the network system 100 is installed/distributed in defines a network environment. Each element of the network system 100 will now be described below by way of example. In one or more embodiments, the network system 100 may include more or less devices than the devices illustrated in FIG. 1, which may be connected to other devices within the network system 100 via wired and/or wireless mediums.

Figure 2:
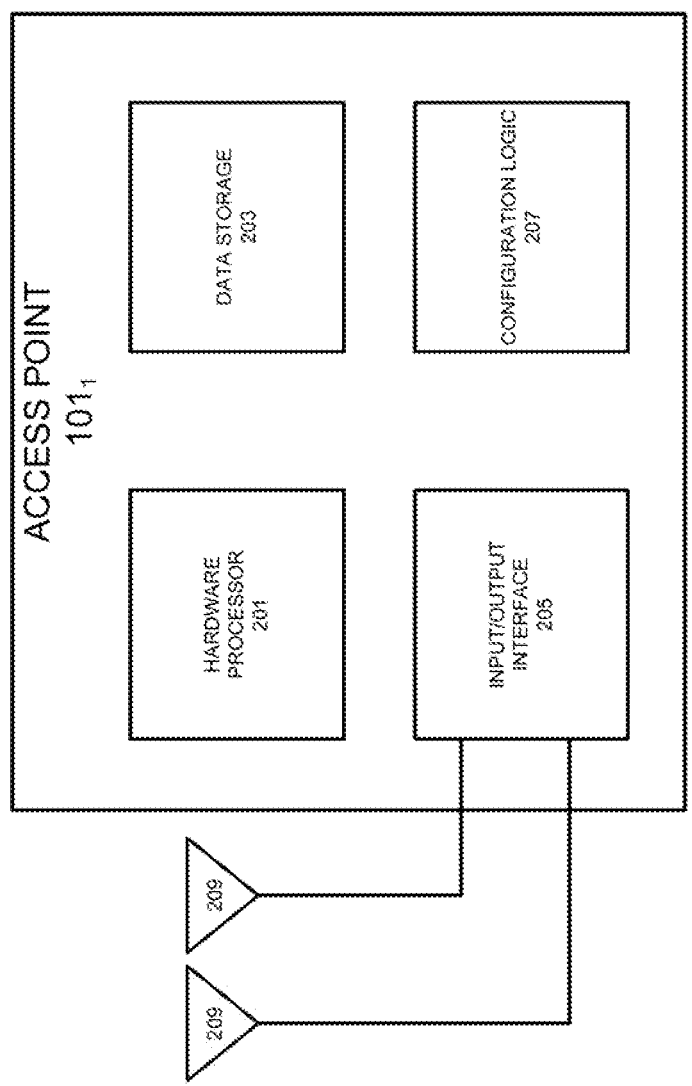
FIG. 2 shows a block diagram example of an access point in accordance with one or more embodiments.

The access points $101_1$-$101_N$ may be any device to which client devices $105_1$-$105_P$ can associate in order to transmit and receive data over wireless channels. Each of the access points $101_1$-$101_N$ may operate on various wireless channels (i.e., frequency segments). In one embodiment, the access points $101_1$-$101_N$ may correspond to a network device such as a wireless access point, a switch, a router, or any combination thereof. FIG. 2 shows a component diagram of the access point $101_1$ according to one embodiment. In other embodiments, the access points $101_2$-$101_N$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during performance of operations/tasks and a hierarchy of persistent memory, such as Read Only Memory (ROM), Erasable Programmable Read Only Memory (EPROM,) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the data storage 203 of the access point $101_1$ may store data to be forwarded to the client devices $105_1$-$105_P$ or to one or more of the network controllers $103_1$-$103_M$.

In one embodiment, the I/O interface 205 corresponds to one or more components used for communicating with other devices (e.g., the client devices $105_1$-$105_P$, the network controllers $103_1$-$103_M$, and/or other access points $101_2$-$101_N$) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client devices $105_1$-$105_P$ and the network controllers $103_1$-$103_M$ over corresponding wireless channels in the system 100.

In one embodiment, the I/O interface 205 facilitates communications between the access point $101_1$ and one or more of the network controllers $103_1$-$103_M$ through the switching fabric 107. In one embodiment, the switching fabric 107 includes a set of network components that facilitate communications between multiple devices. For example, the switching fabric 107 may be composed of one or more switches, routers, hubs, etc. These network components that comprise the switching fabric 107 may operate using both wired and wireless mediums.

In some embodiments, the I/O interface 205 may include one or more antennas 209 for communicating with the client devices $105_1$-$105_P$, the network controllers $103_1$-$103_M$, and/or other wireless devices in the network system 100. For example, multiple antennas 209 may be used for forming transmission beams to one or more of the client devices $105_1$-$105_P$ or the network controllers $103_1$-$103_M$ through adjustment of gain and phase values for corresponding antenna 209 transmissions. The generated beams may avoid objects and create an unobstructed path to the client devices $105_1$-$105_P$ and/or the network controllers $103_1$-$103_M$.

In one embodiment, the hardware processor 201 is coupled to the data storage 203 and the I/O interface 205. The hardware processor 201 may be any processing device including, but not limited to a Microprocessor with Interlocked Pipeline Stages (MIPS)/ARM-class processor, a microprocessor, a digital signal processor, an application specific integrated circuit, a microcontroller, a state machine, a field-programmable gate array (FPGA), or any type of similar type of programmable logic array.

In one embodiment, the device configuration logic 207 includes one or more functional units implemented using firmware, hardware, software, or a combination thereof for configuring parameters associated with the access point $101_1$. In one embodiment, the device configuration logic 207 may be configured to selectively turn RTS/CTS mechanisms on and off based on a variety of factors as will be described in greater detail below.

As described above, the other access points $101_2$-$101_N$ may be similarly configured and designed as described above in relation to the access point $101_1$. For example, the access points $101_2$-$101_N$ may each comprise a hardware processor 201, data storage 203, an input/output (I/O) interface 205, and device configuration logic 207 in a similar fashion as described above in relation to the access point $101_1$.

In one embodiment, the client devices $105_1$-$105_P$ may be any wireless or wired electronic devices capable of receiving and transmitting data over wired and wireless mediums. For example, the client devices $105_1$-$105_P$ may be one or more of personal computers, laptop computers, netbook computers, wireless music players, portable telephone communication devices, smart phones, set-top boxes, tablet computers, and digital televisions. In one embodiment, the client devices $105_1$-$105_P$ are digital devices that include a hardware processor, memory hierarchy, and input/output (I/O) interfaces including a wired and/or wireless interface such as an IEEE 802.3 interface. In one embodiment, the configuration and design of the components within the client devices $105_1$-$105_P$ may be similar to those discussed above in relation to the access point $101_1$. In other embodiments, the client devices $105_1$-$105_P$ may include more or less components than those shown in FIG. 2 in relation to the access point $101_1$.

In one embodiment, the network controllers $103_1$-$103_M$ are digital devices that include a hardware processor, memory hierarchy, and input/output (I/O) interfaces including a wired and/or wireless interface such as an IEEE 802.3 interface. In one embodiment, the configuration and design of the components within the network controllers $103_1$-$103_M$ may be similar to those discussed above in relation to the access point $101_1$. In other embodiments, the network controllers $103_1$-$103_M$ may include more or less components than those shown in FIG. 2 in relation to the access point $101_1$.

As noted above, in some embodiments, the access points $101_1$-$101_N$ and the client devices $105_1$-$105_P$ may utilize RTS/CTS protocols/mechanisms for ensuring that a network channel is clear prior to transmitting one or more data frames. In particular, the access points $101_1$ may wish to send a MAC Protocol Data Unit (MPDU) and/or aggregated MPDUs (AMPDU) to the client device $105_1$ over a shared wireless channel. Prior to transmitting this MPDU/AMPDU frame to the client device $105_1$ over a corresponding shared channel, the access point $101_1$ may first transmit a RTS frame onto the channel. The RTS frame may include various pieces of information, including (1) frame control data, (2) a network allocation vector (NAV), which indicates the period of time the access point $101^1$ is requesting exclusive use of the shared channel, (3) addresses of devices to receive the RTS frame, (4) the address of the access point $101_1$, and (5) frame check sequence data.

Upon receipt, other devices on the same channel (e.g., one or more of the access points $101_2$-$101_N$ and the client devices $105_1$-$105_P$) may process the received RTS frame and transmit CTS frames in response. The CTS frames indicate consent by the other devices operating on the same channel to reserve the channel for the desired period of time (i.e., the NAV time). Accordingly, after receiving CTS frames confirming exclusive use of the shared channel, the access point $101_1$ may transmit the MPDU/AMPDU frame during the NAV time. This exclusive use of the shared channel eliminates the possibility of frame collisions as no other wireless devices are permitted to use the shared channel. Without the use of RTS/CTS protocols/mechanisms, data transmissions may suffer from repeated data collisions over congested channels. These repeated collisions may result in general low throughput and/or failed data transmissions over shared channels.

Although RTS/CTS protocols/mechanisms provide assistance in reducing or eliminating frame collisions over a shared channel, RTS/CTS protocols/mechanisms introduce additional overhead to the channel. In particular, since each MPDU and/or AMPDU frame requires the transmission of corresponding RTS/CTS frames, use of RTS/CTS may add considerable delay and congestion to the channel associated with the transmission of these RTS/CTS frames. Further, in some cases the NAV time, which delineates the exclusive period reserved for the access point $101_1$, may be overestimated. Accordingly, the access point $101_1$ may only transmit for a fraction of the NAV time; however, since no other device is permitted to use the shared channel during the NAV time period, the shared channel may remain unused for the remainder of the NAV time period that is not being used by the access point $101_1$.

Although some protocols require use of RTS/CTS mechanisms for the transmission of every MPDU data frame (e.g., 802.11), these same protocols do not require RTS/CTS use for transmission of AMPDU frames or other data units. Accordingly, in these protocols use of RTS/CTS mechanisms may be selectively toggled on and off based on the network system 100 and/or channel conditions. Several techniques for intelligently toggling RTS/CTS on and off will be discussed below. These techniques may increase throughput and the general efficiency of the network system 100 by toggling RTS/CTS off when potential benefits are minimal and toggling RTS/CTS on when benefits, including reduced collisions, may be more significant.

Network Controller Failover Request

Figure 3:
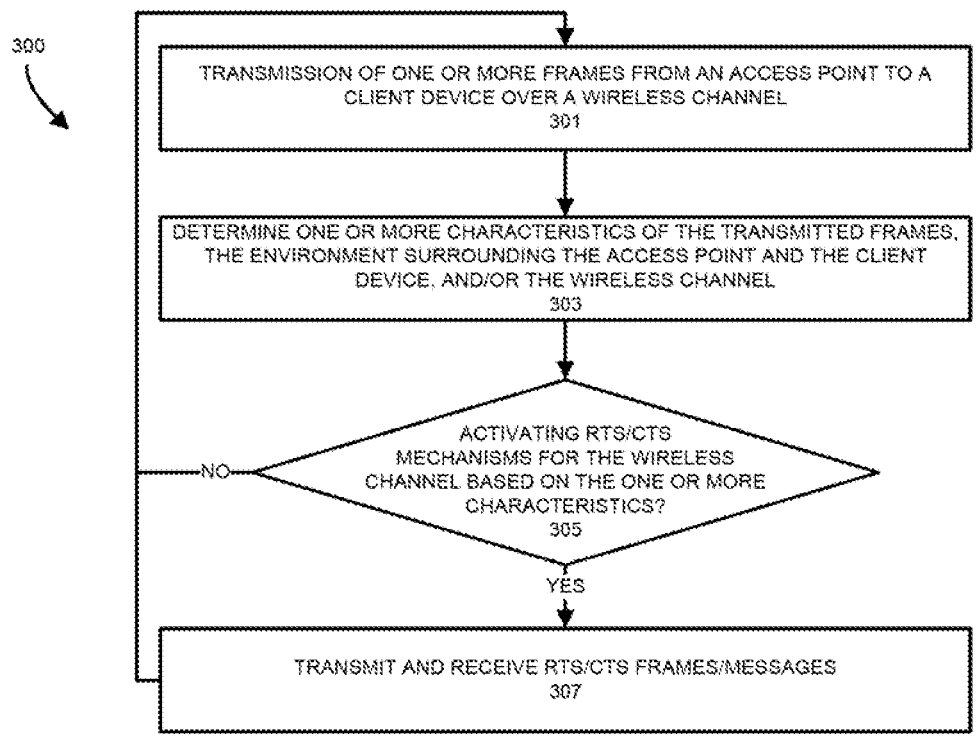
FIG. 3 shows a method for intelligently toggling request-to-send/clear-to-send (RTS/CTS) mechanisms/protocols on and off for a shared channel between an access point and a client device according to one embodiment.

FIG. 3 shows a method 300 according to one embodiment for intelligently toggling RTS/CTS mechanisms/protocols on and off for a shared channel between an access point $101_1$ and a client device $105_1$. The method 300 may be performed by one or more devices in the network system 100. For example, the method 300 may be performed by one or more of the network controllers $103_1$-$103_M$ in conjunction with the access point $101_1$. In one embodiment, one of the network controllers $103_3$-$103_M$ may be designated as a master network controller for the access point $101_1$. In this embodiment, each of the operations of the method 300 may be performed by the master network controller $103_1$-$103_M$.

Although each of the operations in the method 300 is shown and described in a particular order, in other embodiments, the operations of the method 300 may be performed in a different order. For example, although the operations of the method 300 are shown as being performed sequentially, in other embodiments the operations of the method 300 may be performed concurrently or during partially overlapping time periods.

Although described herein in relation to the access point $101_1$ and the client device $105_1$, in other embodiments any set of access points $101_1$-$101_N$ and client devices $105_1$-$105_P$ may be used with the method 300. Accordingly, the method 300 may be performed for each pair of access point $101_1$-$101_N$ and associated client device $105_1$-$105_P$ in the network system 100 to ensure that RTS/CTS protocols/mechanisms are efficiently used in the network system 100.

In one embodiment, the method 300 may commence at operation 301 with the transmission of one or more frames from the access point $101_1$ to the client device $105_1$. The frames may be AMPDU frames that transfer any type of data from the access point $101_1$ to the client device $105_1$. For example, the transferred AMPDU frames may include data corresponding to video and/or audio being streamed via the access point $101_1$ to the client device $105_1$. The transmission at operation 301 may be over a shared wireless channel. In particular, the access point $101_1$ may communicate with the client devices $105_1$-$105_3$ over the same wireless channel (e.g., wireless channel 8 corresponding to 2447 MHz as dictated by the Institute of Electrical and Electronics Engineers (IEEE)). Since multiple devices may be operating on the same wireless channel, frames may be transmitted between devices over this shared medium at the same time. This simultaneous wireless transmission on the same channel/frequency may lead to frame collisions, which negatively affect the performance of the network system 100 by preventing frames from reaching their destination. In particular, frame collisions may corrupt transmitted data and require devices to retransmit corrupted frames at specified intervals. Lost data and retransmission may cause a severe decrease in throughput for the channel and in some cases may cause the access point $101_1$ and the client device $105_1$ to fallback to a data rate that is less than the maximum negotiated data rate.

At operation 303, the method 300 may determine one or more characteristics related to the transmission of the frames at operation 301. The characteristics may describe various features, including (1) the airtime used to transmit frames at operation 301, (2) the data rate used to transmit frames at operation 301, (3) traffic measurements on the wireless channel between the access point $101_1$ and the client device $105_1$, (4) overlapping basic service set (OBSS) traffic measurements, and (5) the number of data units included in frames to be transmitted (e.g., the number of MPDUs in an AMPDU frame). Based on one or more of these characteristics determined at operation 303, operation 305 may toggle RTS/CTS protocols/mechanisms on or off (i.e., activating or deactivating RTS/CTS protocols/mechanisms) for the shared channel and operation 307 may transmit/receive RTS/CTS frames/messages with an appropriate NAV when operation 305 enables RTS/CTS. Several of the characteristics noted above in relation to operation 303 will be described in greater detail below by way of example.

Frame Airtime Usage

Figure 4:
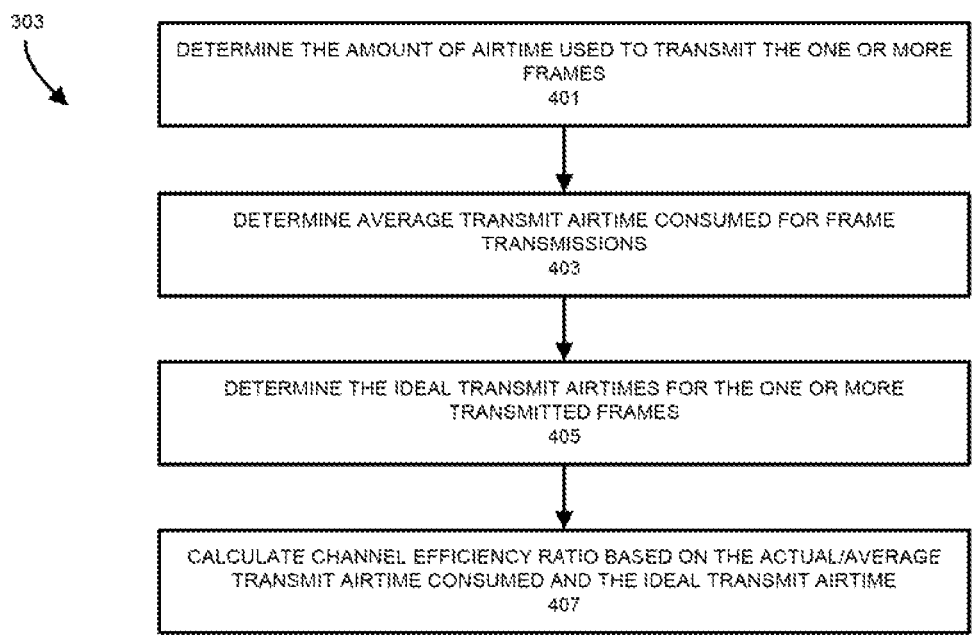
FIG. 4 shows a technique for determining characteristics of transmissions between the access point and the client device according to one embodiment.

FIG. 4 shows operation 303 according to one embodiment. Operation 303 in this embodiment may compare the estimated airtime consumed by the transmission at operation 301 in relation to the expected or ideal amount of airtime used to transmit frames at operation 301. As will be described in greater detail below, this ideal airtime may be calculated based on the maximum data rate negotiated between the access point $101_1$ and the client device $105_1$.

Operation 303 may commence at sub-operation 401 with the determination/recordation of the amount of airtime consumed to complete the transmission of frames at operation 301. The time period for frame transmission completion may be indicated by corresponding acknowledgment messages received by the access point $101_1$ from the client device $105_1$. This determination may be made per frame and/or per target identifier (TID)/flow between the access point $101_1$ and the client device $105_1$. For example, sub-operation 401 may determine that a first frame took five milliseconds to be transmitted from the access point $101_1$ to the client device $105_1$ while a second frame took three milliseconds to be transmitted from the access point $101_1$ to the client device $105_1$.

At sub-operation 403, an average airtime consumed is calculated based on the recorded transmission airtimes determined at sub-operation 401. In some embodiments, this average transmission time may be determined per TID/flow. Accordingly, in these embodiments, separate averages are maintained for each TID/flow. In one embodiment, this airtime average may be calculated per byte of data transmitted between the access point $101_1$ and the client device $105_1$. In particular, the size of each transmitted frame may be determined and used to divide the total transmission time for the frame to arrive at the average transmission airtime per byte of data. As noted above, this average may be per TID/flow such that the separate airtime-byte averages are kept/recorded for each TID/flow. By determining average airtime used per byte, the size of frames may be ignored. Accordingly, various sized frames may be transmitted at operation 301 without regard to the running averages prepared at sub-operation 403. Although discussed in relation to byte averages, in other embodiments other data unit sizes may be used (e.g., airtime-bit averages per TID/flow).

At sub-operation 405, the ideal transmission airtimes may be calculated for each frame transmitted at operation 301. The ideal airtime for transmission may represent the optimal transmission time based on the maximum data rate negotiated between the access point $101_1$ and the client device $105_1$. For example, with transmissions on 5 GHz bands of IEEE 802.11ac, the possible data rates may be 2,600 Mbit/s, 1,733 Mbit/s, 1,300 Mbit/s, 975 Mbit/s, 867 Mbit/s, 450 Mbit/s, and 433 Mbit/s. In this scenario, the client device $105_1$ may have negotiated a maximum data rate of 1,300 Mbit/s with the access point $101_1$. This maximum data rate represents an ideal transmission data rate between the access point $101_1$ and the client device $105_1$; however, a lesser data rate may be selected based on channel/network conditions. For example, after a series of collisions and potential transmission failures based on simultaneous transmission by other devices on the same channel, the access point $101_1$ may decide to fallback to a lower data rate to better ensure successful transmission to the client, device $105_1$. Although the likelihood of successful transmission may increase since lower data rates may have coding schemes that increase data redundancy, throughput on the channel may suffer using these lower data rates.

As noted above, in one embodiment, the ideal airtime for frame transmission may be calculated based on the maximum data rate negotiated between the access point $101_1$ and the client device $105_1$. For example, the ideal transmission airtime may be calculated as the reciprocal of the maximum data rate as shown in Equation 1 below:

$$\text{Ideal } TX \text{ Airtime} = \frac{1}{\text{Maximum } TX \text{ Data Rate}} \quad \text{Equation 1}$$

This ideal transmission airtime is the minimum airtime needed to transmit one piece (e.g., bit/byte) of information from the access point $101_1$ to the client device $105_1$.

In some embodiments, overhead factors may be added to this ideal transmission airtime estimate. In one embodiment, these overhead factors may be calculated based on (1) the actual airtime to transmit frames determined at sub-operations 401 and 403, (2) the size of transmitted frames, and (3) the data rate used to transmit frames. In particular, the size of a frame or the average size of a set of frames in the same TID/flow may be divided by the data rate used to transmit frames from the access point $101_1$ to the client device $105_1$ to compute the theoretical transmission airtime per frame or set of frames as shown in Equation 2 below:

$$\text{Theoretical } TX \text{ Airtime} = \frac{\text{Size of Frame}}{TX \text{ Data Rate}} \quad \text{Equation 2}$$

The theoretical transmission airtime may be subtracted from the actual transmission airtime determined at operations 401 and/or 403 to determine transmission overhead as shown in Equation 3 below:

TX Overhead=Actual TX Airtime−Theoretical TX Airtime  Equation 3

This transmission overhead may be added to the ideal transmission airtime from Equation 1 to arrive at a more accurate ideal transmission airtime estimate as shown in Equation 4 below:

$$\text{Ideal } TX \text{ Airtime} = \frac{1}{\text{Maximum } TX \text{ Data Rate}} + TX \text{ Overhead} \quad \text{Equation 4}$$

At sub-operation 407, the ratio of the actual transmission airtime to the ideal transmission airtime for transmission of frames at operation 301 may be calculated as shown in Equation 5 below to produce a channel efficiency ratio:

$$\text{Channel Efficiency Ratio} = \frac{\text{Actual TX Airtime}}{\text{Ideal TX Airtime}} \quad \text{Equation 5}$$

This ratio may be the characteristic of the channel generated by operation 303. As will be described in greater detail below, this channel efficiency ratio may be used for determining when to toggle RTS/CTS on and off for a particular shared channel at operation 305. For example, when the ratio is above a particular threshold (e.g., above a threshold of 0.8), the method 300 may determine at operation 305 that the shared channel is being lightly utilized (e.g., no/low level of possible collisions and corresponding retries and transmitting at the maximum negotiated data rate). Accordingly, RTS/CTS may be turned off at operation 305 as the shared channel is not overly utilized. Conversely, when the ratio is below a particular threshold, the method 300 may determine at operation 305 that the shared channel is being highly utilized, resulting in frame collisions and operating at a rate lower than the maximum negotiated rate. Accordingly, RTS/CTS may be turned on at operation 305 as the shared channel is overly utilized resulting in failed delivery of frames.

In some embodiments, this channel efficiency ratio may be aggregated over a designated period of time. In these embodiments, the aggregated running average channel efficiency ratio may be used for enabling and disabling RTS/CTS.

Traffic Measurements on the Wireless Channel

In some embodiments, RTS/CTS protocols/mechanisms may be enabled even when the calculated channel efficiency ratio is above the predefined threshold. In particular, operation 305 may determine that the bandwidth of the channel is not being fully utilized or will not be fully utilized. For example, when the maximum negotiated data rate between the access point $101_1$ and the client device $105_1$ is 1,300 Mbits/s, the access point $101_1$ may only be transmitting/offering data at 100 Mbits/s. In this example, adding additional packets for RTS/CTS will not cause the wireless channel to be overly congested as the amount of data desired to be transmitted by the access point $101_1$ is at low level in relation to the data rate for the channel. Accordingly, even though the channel efficiency ratio is above a predefined threshold, RTS/CTS may be enabled as the channel is not near capacity and RTS/CTS may be used to prevent/reduce collisions with little reduction in performance. In one embodiment, sub-operation 407 may determine the current and/or expected capacity of the wireless channel along with the efficiency ratio and operation 305 may compare this capacity information against a capacity threshold (e.g., 10%-20% of channel capacity) to determine whether to enable RTS/CTS protocols/mechanisms. Accordingly, traffic/channel capacity may override channel efficiency ratios to conservatively apply RTS/CTS protocols/mechanisms when doing so would not negatively impact performance of the channel.

Data Rate Control

Figure 5:
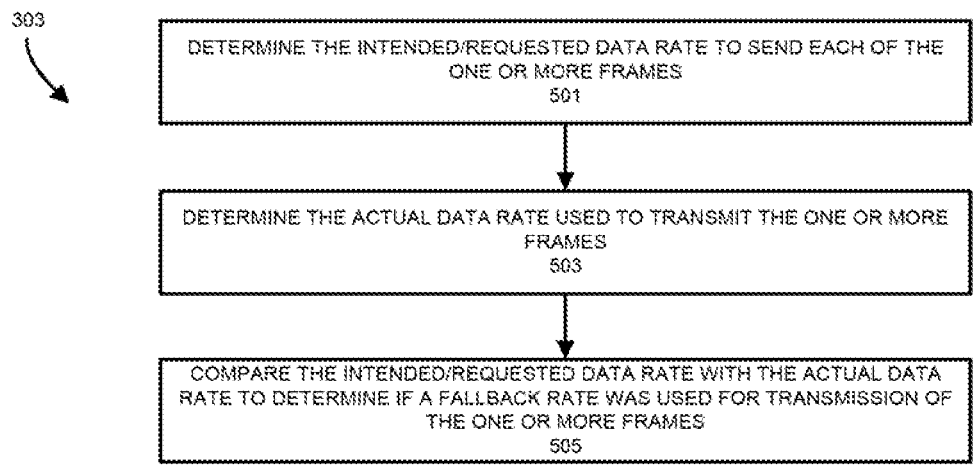
FIG. 5 shows a technique for determining characteristics of transmissions between the access point and the client device according to another embodiment.

FIG. 5 shows operation 303 according to another embodiment. Operation 303 in this embodiment may compare a desired/intended data rate for transmitting frames at operation 301 and the actual rate used to transmit frames at operation 301. As will be described in greater detail below, when differences appear between these two data rate values, the method 300 may determine that RTS/CTS mechanisms may be appropriate.

Operation 303 may commence at sub-operation 501 with the determination of the intended/requested data rate to send each of the frames at operation 301. For example, the frames transmitted at operation 301 may have been passed down from an upper software layer to a lower hardware layer. The software layer may inform the hardware layer of the desired transmission data rate for the frames. For instance, the software layer may indicate a transmission data rate of 1,300 Mbits/s. Accordingly, sub-operation 501 may determine the intended/requested data rate to send each of the frames by requesting information from the software layer. In some embodiments, this intended/requested data rate may be the maximum data rate negotiated between the access point $101_1$ and the client device $105_1$.

At sub-operation 503, the operation 303 may determine the actual transmission rate used to transmit each of the frames. As noted above, a software layer may indicate an intended/requested data rate for transmitting the frames at operation 301. However, the hardware layer may be unable to transmit frames at this data rate. In particular, transmissions may encounter collisions, retries, and consequent failed delivery as a result of the coding schemes used to transmit at these higher data rates and the traffic on the shared channel. As a result, the hardware layer may use a fallback data rate to transmit frames at operation 301 based on the inability to successfully transmit to the client device $105_1$ at the higher intended/requested data rate. For example, when the intended/requested data rate is 1,300 Mbit/s, fallback data rates may be 975 Mbit/s, 867 Mbit/s, 450 Mbit/s, and 433 Mbit/s. Sub-operation 503 may determine the actual data rate used to transmit the frames at operation 301 by polling the hardware layer for this information.

At sub-operation 505, the operation 303 may compare the intended/requested data rate determined at sub-operation 501 with the actual data rate determined at sub-operation 503. Sub-operation 505 may report/pass this similarity or difference to operation 305. When sub-operation 505 indicates a difference between the intended/requested data rate to the actual data rate, operation 303 may enable RTS/CTS. In particular, when the intended/requested data rate is different from the actual data rate, this difference may indicate that frame collisions and/or transmission failures have occurred that have caused use of a fallback data rate. Accordingly, RTS/CTS may be enabled in this scenario to ensure delivery of frames. Conversely, when the intended/requested data rate is identical to the actual data rate, operation 303 may disable RTS/CTS. This consistency amongst intended/requested and actual data rates may indicate that no frame collisions are occurring on the channel. Accordingly, in this scenario the overhead associated with RTS/CTS does not need to be incurred to ensure successful frame transmissions as frames are already being successfully transmitted without use of RTS/CTS.

Overlapping Basic Service Set (OBSS) Measurements

In one embodiment, operation 303 may (1) determine if one or more other access points $101_2$-$101_N$ are sharing the same channel as the access point $101_1$ and (2) analyze the level of traffic on this shared channel. In particular, the access point $101_1$ may record an Overlapping Basic Service Set (OBSS) measurement, which indicates the level of traffic on the channel caused by other access points $101_2$-$101_N$. When this measurement is above a predefined OBSS threshold level (e.g., 2%-10%), this may indicate a large level of overlapping traffic on the shared channel. Accordingly, operation 305 may determine that use of the channel will be highly contentious and may enable RTS/CTS. As noted above, using RTS/CTS may reduce the level/chance of collisions and consequent failures on highly contentious channels. Conversely, when the OBSS measurement is below the predefined OBSS threshold level, this may indicate a low level of traffic on the shared channel. Accordingly, operation 305 may determine that use of the channel is not highly contentious and may disable RTS/CTS. As noted above, by not using RTS/CTS, unneeded RTS/CTS packets/messages may not be added to the channel for each frame, which consequently improves throughput on the shared channel.

Number of Data Units in a Frame

In one embodiment, operation 305 may toggle RTS/CTS on and off based on the number of data units included in transmitted frames. For example, a frame to be transmitted may be an AMPDU frame. When operation 303 determines that this AMPDU frame contains a large number of MPDUs (i.e., above a particular threshold number), operation 305 may toggle RTS/CTS on. Conversely, when operation 303 determines that this AMPDU frame contains a small number of MPDUs (i.e., below a particular threshold number), operation 305 may toggle RTS/CTS off. By using RTS/CTS when large size frames are being transmitted, the method 300 ensures that large packets, which take a greater time to transmit, are not affected by collisions that would require a comparable amount of time to continually retransmit. Since RTS/CTS packets are relatively small in comparison to these large frames, the performance impact will be small. However, when frames to be transmitted are relatively small, RTS/CTS may not be used since the potential cost of retransmitting these smaller frames may be small while the cost of adding RTS/CTS packets to the channel may be comparatively larger and this may impact channel performance.

In some embodiments, the characteristics determined at operation 303 may include the number of data units in a frame to be transmitted (i.e., the size of the frame) in relation to the allocated time for transmission (Le. NAV designated by RTS/CTS frames/messages). When the NAV is greater by a predefined threshold amount than the airtime needed to transmit the frame (e.g., NAV is 30% greater than airtime needed to transmit frame), operation 305 may determine that RTS/CTS is not necessary and may toggle RTS/CTS off. By toggling RTS/CTS off in this scenario, operation 305 ensures that channel capacity is not wasted with dead time that is not needed to transmit a frame.

In other embodiments, other characteristics may be used for determining whether to enable or disable RTS/CTS. For example, the number of retries needed to successfully transmit one or more previous frames may be determined at operation 303 and used at operation 305 for toggling RTS/CTS on and off. For example, when the number of retries used to transmit a previous frame is above a threshold level (e.g., three retries), operation 305 may determine that the number of collisions is high and the strong likelihood of future collisions warrants enabling RTS/CTS.

In some embodiments, the method 300 may be performed between unsuccessful attempts by the access point $101_1$ to transmit a frame to the client device $105_1$. For example, upon the access point $101_1$ failing to transmit a frame at operation 301 to the client device $105_1$, operations 303, 305, and/or 307 may be performed to determine whether RTS/CTS should be turned on before a subsequent retransmission of the same frame at operation 301.

Although described separately, two or more of the characteristics described above as being determined at operation 303 may be jointly used by operation 305 to toggle RTS/CTS on and off. In some embodiments, the decision on toggling RTS/CTS on and off may be performed on a frame-by-frame basis (e.g., for each AMPDU). Accordingly, after determining at operation 305 to enable/disable RTS/CTS and transmitting/receiving RTS/CTS frames when appropriate at operation 307, the method 300 may return to operation 301 to transmit a frame. Characteristics related to the transfer of this frame may be used, along with the transmission of any selection of other previously transmitted frames for the toggling of RTS/CTS for a subsequent frame. Accordingly, each frame may benefit from the analysis of previously transmitted frames.

As described above, the method 300 intelligently toggles RTS/CTS mechanisms/protocols on and off for a shared channel between an access point $101_1$ and a client device $105_1$. In particular, the method 300 may determine one or more characteristics related to the transmission of frames and toggle RTS/CTS based on these characteristics. The characteristics may describe various features, including (1) the airtime used to transmit frames, (2) the data rate used to transmit frames, (3) traffic measurements on the wireless channel between the access point $101_1$ and the client device $105_1$, (4) OBSS traffic measurements, and (5) the number of data units included in frames to be transmitted (e.g., the number of MPDUs in an AMPDU frame). By toggling RTS/CTS on and off based on network/channel and frame conditions/characteristics, the method 300 ensures that RTS/CTS is enabled when frame collisions are likely and/or channel capacity is low and disabled when frame collisions are unlikely and the overhead associated with RTS/CTS outweighs the potential benefits.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages is applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising to:

obtain characteristics related to transmission of a first set of data, wherein the characteristics comprise an actual transmission airtime for the first set of data relative to an ideal transmission airtime for the first set of data;

dynamically determine whether to transmit a particular frame to set a Network Allocation Vector (NAV) prior to transmission of a second set of data based on whether the characteristics related to transmission of the first set of data meet a particular criteria;

responsive to determination that the characteristics do not meet the particular criteria, transmit the particular frame prior to transmission of the second set of data; and responsive to determination that the characteristics meet the particular criteria, transmit the second set of data without transmission of the particular frame prior to transmission of the second set of data.

2. The medium of claim 1, wherein the particular frame comprises: a Clear-To-Send (CTS) frame and/or a Request-To-Send (RTS) frame.

3. The medium of claim 1, wherein the characteristics, related to the transmission of the first set of data, comprise: airtime used for transmission of the first set of data.

4. The medium of claim 1, wherein the characteristics, related to the transmission of the first set of data, comprise: {a) airtime used for transmission of the first set of data and (b) a size of the first set of data.

5. The medium of claim 1, wherein the characteristics, related to the transmission of the first set of data, comprise: a fallback rate used for transmission of the first set of data.

6. The medium of claim 1, wherein the characteristics, related to the transmission of the first set of data, comprise: Overlapping Basic Service Set (OBSS) traffic measurements.

7. The medium of claim 1, wherein to dynamically determine whether to transmit the particular frame prior to transmission of a second set of data is further based on (a) a size of the second set of data and (b) an amount of time allocated for transmission of the second set of data.

8. The medium of claim 1, wherein the characteristics, related to the transmission of the first set of data, comprise: a channel load value for a radio frequency channel used for transmission of the first set of data.

9. The medium of claim 1, wherein the characteristics, related to the transmission of the first set of data, comprise: an average airtime used for transmission of data units in the first set of data.

10. The medium of claim 1, wherein the characteristics, related to the transmission of the first set of data, comprise: a retry rate used for transmission of the first set of data.

11. The medium of claim 1, wherein transmission of the second set of data comprises re-transmission of the first set of data.

12. A system comprising:
at least one device including a hardware processor;
the system being configured to perform operations comprising to:

obtain characteristics related to transmission of a first set of data, wherein the characteristics comprise an actual transmission airtime for the first set of data relative to an ideal transmission airtime for the first set of data;

dynamically determine whether to transmit a particular frame to set a Network Allocation Vector (NAV) prior to transmission of a second set of data based on whether the characteristics related to transmission of the first set of data meet a particular criteria;

responsive to determination that the characteristics do not meet the particular criteria, transmit the particular frame prior to transmission of the second set of data;

responsive to determination that the characteristics meet the particular criteria, transmit the second set of data without transmission of the particular frame prior to transmission of the second set of data.

13. The system of claim 12, wherein the particular frame comprises: a Clear-To-Send (CTS) frame and/or a Request-To-Send (RTS) frame.

14. The system of claim 12, wherein the characteristics, related to the transmission of the first set of data, comprise: airtime used for transmission of the first set of data.

15. The system of claim 12, wherein the characteristics, related to the transmission of the first set of data, comprise: (a) airtime used for transmission of the first set of data and (b) a size of the first set of data.

16. The system of claim 12, wherein the characteristics, related to the transmission of the first set of data, comprise: a fallback rate used for transmission of the first set of data.

17. The system of claim 12, wherein the characteristics, related to the transmission of the first set of data, comprise: Overlapping Basic Service Set (OBSS) traffic measurements.

18. The system of claim 12, wherein to dynamically determine whether to transmit the particular frame prior to transmission of a second set of data is further based on (a) a size of the second set of data and (b) an amount of time allocated for transmission of the second set of data.

19. The system of claim 12, wherein the characteristics, related to the transmission of the first set of data, comprise: a channel load value for a radio frequency channel used for transmission of the first set of data.

20. The system of claim 12, wherein the characteristics, related to the transmission of the first set of data, comprise: an average airtime used for transmission of data units in the first set of data.

21. The system of claim 12, wherein the characteristics, related to the transmission of the first set of data, comprise: a retry rate used for transmission of the first set of data.

22. The system of claim 12, wherein transmission of the second set of data comprises re-transmission of the first set of data.

* * * * *